Figure 1:
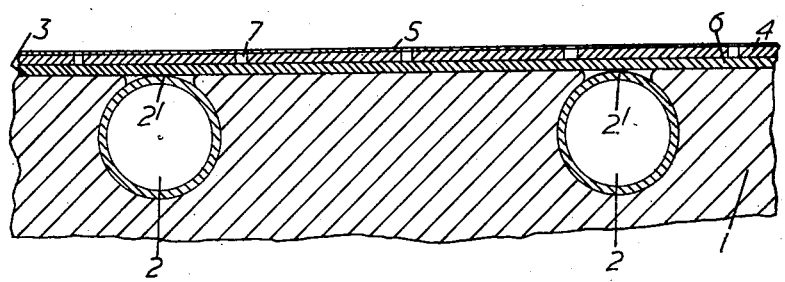

April 21, 1964     H. Z. TABOR     3,129,703
SURFACES FOR COLLECTORS OF SOLAR RADIATION
Filed April 11, 1960

Inventor

By

Attorney

United States Patent Office 3,129,703
Patented Apr. 21, 1964

3,129,703
SURFACES FOR COLLECTORS OF
SOLAR RADIATION
Harry Zvi Tabor, Beth Hakerem, Jerusalem, Israel, assignor to The Government of Israel on behalf of the State of Israel, Jerusalem, Israel
Filed Apr. 11, 1960, Ser. No. 21,257
Claims priority, application Israel Apr. 16, 1959
4 Claims. (Cl. 126—270)

The present invention relates to solar heaters, and particularly to solar heaters of the type generally referred to as having "receivers" which absorb impinging solar radiation and convert it into utilizable heat.

Solar heaters generally comprise a receiver, and a heat transfer body whose function is to absorb heat and transfer the absorbed heat to a heat transfer medium, e.g. water, which may pass to a heat storage system, such as a hot water boiler.

In accordance with U.S. Patent No. 2,917,817 receivers for solar heaters are known which are composite bodies comprising a metal base and a thin coating applied to the base in heat-conducting relation, the physical properties of the base and coating in their behaviour to light and heat being so selected that the coating is consequently not heat-absorbing, substantially no heat is radiated from the base through the coating and the receiver as a whole is light-absorbing and substantially not heat-emissive.

These receivers are selective in their behaviour towards impinging radiation in that they are capable of absorbing visible radiation, converting it into heat and retaining the latter because of their very low heat emissivity. In other words, these receivers are "black" in regard to visible radiation and "white" in regard to heat radiation.

The formation of a surface of such specific optical properties calls for special methods which require high skill and considerable technical know-how. As the receiver is as a rule an integral part of the heat-transfer body of which it forms merely the upper surface, it is necessary during production to submit the entire heat transfer body to the handling and treatment required for applying the coating in order to produce the above selective receiver. This means, for example, that the entire body has to be dipped into an electrolytic bath in case the coating is formed electrolytically, or into a coating solution in case the coating is formed chemically. The necessity to handle the entire heat transfer body of the solar heater for coating one of its surfaces is in itself a serious disadvantage which becomes all the more pronounced because as a rule the manufacturers of solar heaters lack the equipment and technical knowledge necessary for forming the coating.

The optical phenomena referred to above which lead to the absorption of visible light, its conversion into utilizable heat and the retention of the latter, all occur on the surface which comprises the coating while the remainder of the base has mainly the function of transferring the heat to a heat-transfer medium such as water, oil or the like, whereby the base serves as merely a heat transfer body.

The present invention contemplates that the receiver-heat transfer unit of a solar heater can be made of two parts, viz. an upper one on which occurs the optical phenomena and which may be comparatively thin, and a lower one which serves for heat transfer.

The invention is directed to a solar heater of the kind in which the receiver is a composite body comprising a metal base and a thin coating applied to the base in heat-conducting relation, the physical properties of the base and coating in their behavior to light and heat being so selected that the coating is substantially not heat absorbing, so that substantially no heat is radiated from the base through the coating and the receiver as a whole is light absorbing, and substantially not heat emissive, said receiver being characterized in that the base of the receiver is a thin, metallic foil which is applied to the heat transfer body in a heat-conducting manner.

The foil may be made entirely of metal, or may consist of a metallized non-metallic substance, for example, a synthetic plastic sheet material. For the purposes of the present invention all these foils are considered and referred to as a "metallic foil."

The foil has to be stable under operating conditions, i.e. under prolonged heating. It has been found that aluminium and nickel are the most suitable materials though other metals such as copper, copper-nickel alloys, stainless steels, bronzes and the like can be used. The thickness of the foil is not critical. However, very thin foils are difficult to handle while it is difficult to ship rolls of very thick foils. In practice, a suitable thickness is from 0.02 to 0.25 mm.

As a rule the foil will be applied to the main body by means of a heat-conducting adhesive layer stable at the operating temperatures. Generally it is difficult to apply a foil of considerable surface area to a base without trapping a certain amount of air between the foil and base. When the foil becomes hot the trapped air expands and produces blisters on the foil which form areas where the thermal contact between the foil and the receiver surface is greatly reduced. Since good thermal contact is required, such blisters must be reduced to negligible proportions and according to a preferred embodiment of the invention, this is obtained by perforating the foil and/or the heat transfer body with small holes, such as pin pricks at intervals of about a centimeter.

The invention also contemplates providing sheets adapted to be applied as receivers to heat transfer bodies of solar heaters, comprising a metallic foil and a thin coating applied to one of its faces in a heat-conducting relation, the properties of the foil and coating in their behavior to light and heat being so selected that the coating is substantially not heat absorbing, so that substantially no heat will be radiated from the foil through the coating while the sheet as a whole is light-absorbing and substantially not heat emissive.

According to a preferred embodiment these sheets are perforated with very small holes, e.g. pin pricks, at intervals of one centimeter or so.

In accordance with the invention, the manufacture of the solar heater and the preparation of the radiation-absorbing surface are separate operations. The sheets according to the invention can be prepared in special factories, shipped in the form of rolls, sold according to length and applied to any conventional solar heater.

The adhesive layer connecting the sheet and the base must be uniform and accordingly has to be applied by suitable coating devices either to the top face of the heat transfer body of the receiver or to the back of the sheet itself. As a rule the later alternative will be preferred for practical reasons, since factories equipped for the application of the "optical" coating are as a rule also able to adapt their equipment to the coating of the sheets with an adhesive, while factories specialized in the manufacture of solar heaters are as a rule not so equipped.

Figure 2:
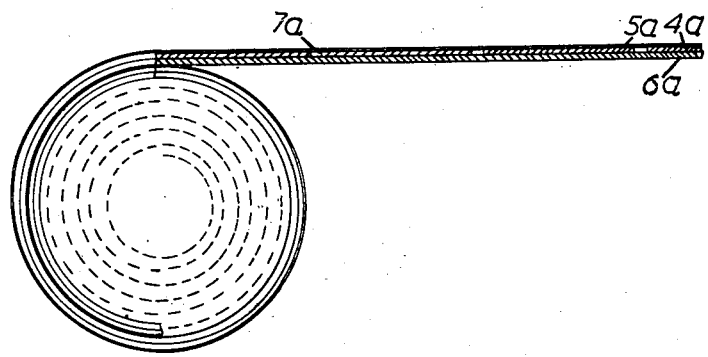

The invention is illustrated, by way of example only, in the accompanying drawings in which:

FIG. 1 is a fragmentary cross section of a receiver for solar heaters in accordance with the invention; and FIG. 2 is a side elevation, partly in longitudinal section, of a sheet according to the invention wound for shipment.

The receiver illustrated in FIG. 1 comprises a heat transfer body 1 traversed by pipes 2 for the circulation of the heat exchange fluid, e.g. water, oil or the like. Pipes 2 are so disposed that their upper section 2' is flush with the upper face 3 of body 1. To the face 3 there is applied, by means of an adhesive layer 6 a foil 4 of aluminium, nickel or any other suitable metal, to whose upper face a coating 5 is applied. The coating is so constituted that the optical behavior of foil 4 and coating 5 together is as specified hereinbefore. The coating 5 and foil 4 are perforated with a large number of small holes 7 for the escape of the air trapped between the foil and base.

FIG. 2 illustrates a roll of a sheet according to the invention in the form in which it is shipped. The sheet comprises a metal foil 4a, one face of which bears the "optical" coating 5a, while its back is coated with an adhesive layer 6a. The foil 4a and coating 5a are perforated with a large number of small holes 7a. Advantageously the adhesive layer is protected by a release backing of paper or the like (not shown).

An optical coating having the desired properties and methods of applying the same to the foil is described in U.S. Patent No. 2,917,817. For foils which can easily be rolled up, the application of the coating is conveniently carried out in a continuously operating coating or electroplating machine designed for the purpose. Thus, while the receivers of the solar heaters according to the present invention are coated according to the teachings of U.S. patent specification No. 2,917,817, the present invention is an improvement of the receiver according to said patent in that it provides a novel stratified structure of the receiver which is of great practical advantage and will become apparent further below.

Adhesives stable at elevated operating temperatures are readily available. An adhesive which is either free of solvents or pre-dried before the two surfaces are brought together, is preferred in order to minimize the formation of blisters. A suitable adhesive is for example that known as No. 269, manufactured by the Dow Corning Corporation of the U.S.A., made by dissolving dimethyl polysiloxane in xylene and being a pressure sensitive adhesive which is dried after application to one surface of the foil by heating to 150–200° C. for 5–15 minutes. The adhesive layer is made as thin as practicable, e.g. of the order of 0.1 mm. or less. The temperature drop between the foil and heat transfer body has been found to be only a few degrees when the heater is irradiated by noon sunshine. Even though such adhesives may be chosen as produce very little vapor after the initial drying process, it is not easy to avoid the trapping of air bubbles when a large area of foil is applied to the base, but in this case the perforations 7 as referred to above, provide an escape for the trapped air. In some cases it is found convenient to apply a pressure roller to the heated finished assembly in order to ensure expulsion of air or vapor through the perforations.

I claim:

1. A solar heater comprising a receiver constituted by a thin flexible metallic foil and means defining a surface coating on said foil in face to face heat conducting relation therewith, the receiver being flexible and adapted for being wound in a roll, said heater further comprising a heat transfer body, and adhesive means joining the receiver in heat conducting relationship to the heat transfer body, said surface coating being light absorptive, heat transparent and non radiant of heat to confer a substantially low heat emissivity for said receiver in order that impinging light energy is absorbed in said coating and is transferred in the form of heat to said foil with comparatively small losses of heat by re-radiation from said foil, said foil, by virtue of the heat conducting relation established with the body being operative to transfer heat to said heat transfer body whereat accumulation of heat may be effected while said receiver prevents emission of heat from said body.

2. A heater as claimed in claim 1 wherein the foil is constituted of aluminum.

3. A heater as claimed in claim 1 wherein the foil is constituted of nickel.

4. A heater as claimed in claim 1 wherein the foil and coating are provided with a plurality of coincident holes.

References Cited in the file of this patent

UNITED STATES PATENTS

| | | |
|---|---|---|
| 2,402,737 | Delano | June 25, 1946 |
| 2,788,316 | Bjorksten | Apr. 9, 1957 |
| 2,843,536 | Mount | July 15, 1958 |
| 2,850,404 | Dunlap | Sept. 2, 1958 |
| 2,889,233 | Steffey | June 2, 1959 |
| 2,917,817 | Tabor | Dec. 22, 1959 |
| 2,998,006 | Johnston | Aug. 29, 1961 |
| 3,000,375 | Golay | Sept. 19, 1961 |

FOREIGN PATENTS

| | | |
|---|---|---|
| 821,237 | Great Britain | Oct. 7, 1959 |

OTHER REFERENCES

"Solar Heating for Swimming Pools," New Zealand Engineering, September 15, 1956, pages 298–299.